July 25, 1939.  J. KIEFFER  2,167,115
RADIATION METHOD AND APPARATUS
Filed Sept. 10, 1937   4 Sheets-Sheet 3

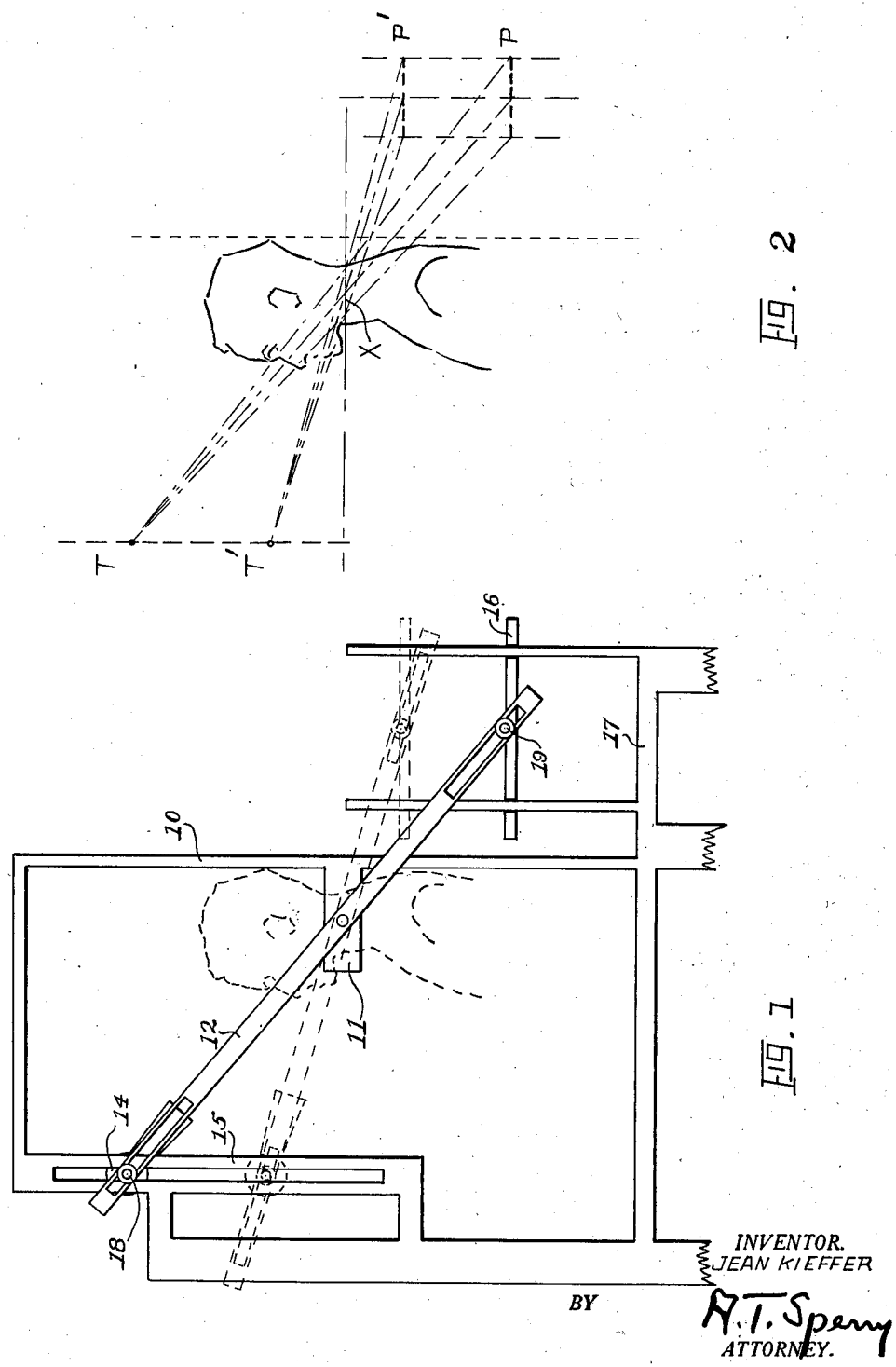

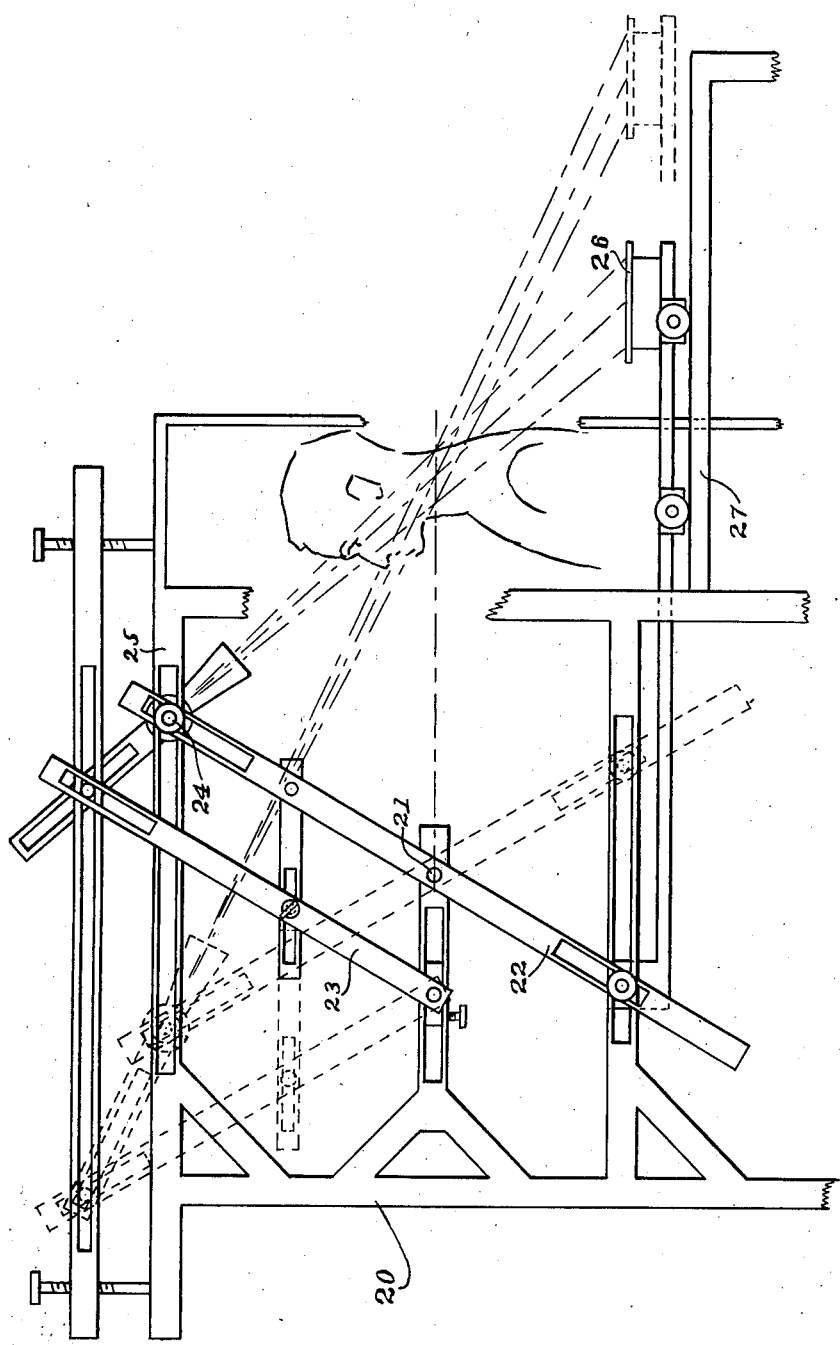

INVENTOR.
JEAN KIEFFER
BY
ATTORNEY.

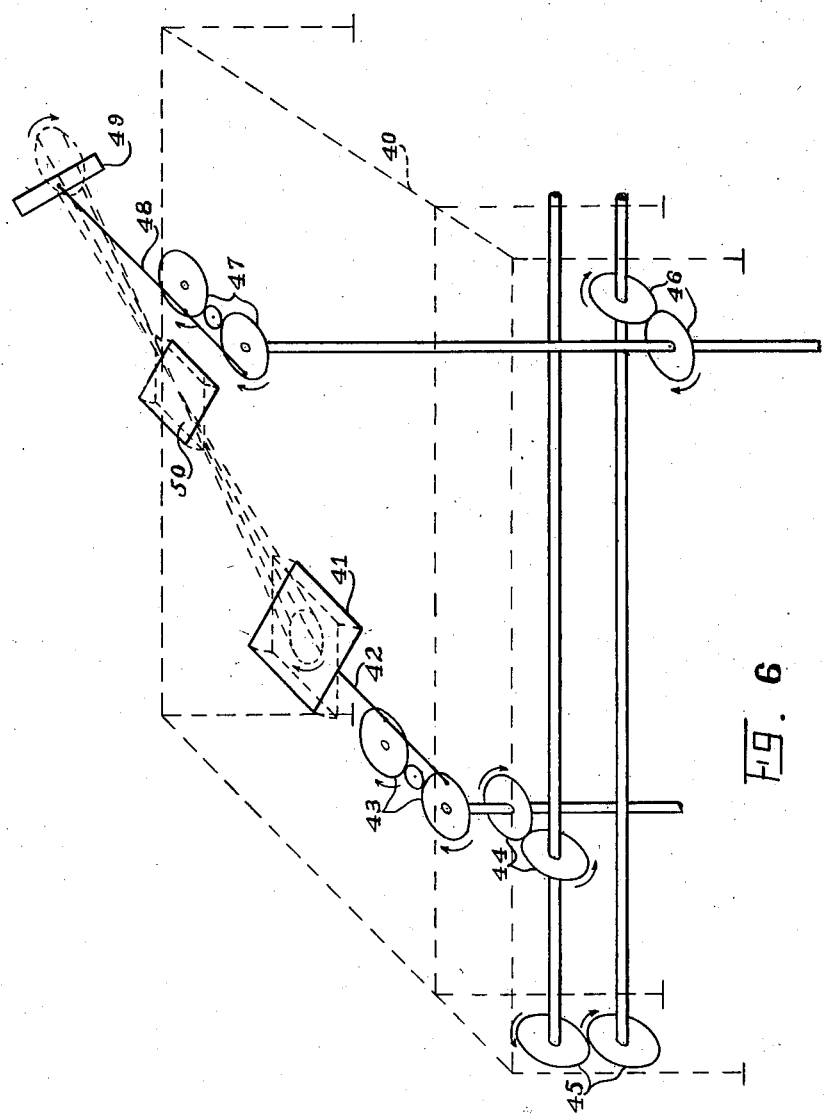

Patented July 25, 1939

2,167,115

UNITED STATES PATENT OFFICE 2,167,115

RADIATION METHOD AND APPARATUS

Jean Kieffer, Norwich, Conn.

Application September 10, 1937, Serial No. 163,219

18 Claims. (Cl. 250—58)

The present invention is primarily concerned with a radiographic method and means for securing the virtual focusing of X-rays. As such, the invention is a companion invention to the inventions disclosed in my prior patent, No. 1,954,321, and my co-pending application, Ser. No. 143,445, filed May 19, 1937, and therewith partakes of the objects and advantages therein set forth.

Generally stated, the inventions of my prior patent and co-pending application, insofar as they relate to radiography, are concerned with the synchronous proportional and opposite movement during exposure of a source of radiation and a sensitive medium whereby a radiograph of a selected plane may be achieved with less obstruction from objects lying between the tube and plate, but located in other planes, than obtained in conventional X-ray practice. By referring to my prior patent and my co-pending application, it will be understood that the plane to be most clearly visualized is determined by the plane in which the axis of the movement of the source of radiation and the movement of the sensitive medium is located.

The present invention, in its preferred embodiment, utilizes this principle and applies it to X-ray visualization in planes parallel to the longitudinal axis of the body, or in selected planes at various angles through an object as distinct from the limitation of this principle solely to planes parallel to the longitudinal axis of an object. It will, of course, be understood that the principles, technique and apparatus of the present invention are equally applicable for radiographic and fluoroscopic work, either by X-ray, radium or similar radiations.

Throughout this specification, I am using the term "longitudinal axis" to imply the direction of the longitudinal axis of a human body when it is in the usual X-ray position, i. e., standing between the tube and plate in the vertical position, or lying on the table of a horizontal X-ray machine. It is, of course, understood that no limitation is implied in such broad use of the term "longitudinal axis", it being, of course, obvious that in many instances the body may have a greater dimension cross-wise, with respect to the tube and plate, than length-wise. The term "longitudinal axis" is, therefore, meant to imply any axis passing between the tube and plate and which may be thus infinitely long.

The term "longitudinal axis" is not intended to limit the scope of either description or claims by prescribing that the body examined shall be in an erect position. The term is used because it is necessary to have an axis of reference and to acquaint those skilled in the art with the fact that it is as easy by my method and with my apparatus to obtain radiographs of selected laminations crosswise thru the human body as it is to obtain them lengthwise.

The method and means of the present invention accomplish the objective of widening the scope of virtual focusing of X-rays, or similar radiation, to include the radiography or fluoroscopy of planes at various angles through an object by one of two means, or a combination thereof. First, by what I please to term a "decentering" of the mechanism with respect to the object field. Decentering differentiates from my other planigraphic methods in that, where heretofore the center of the field of movement of both target and film was on a normal axis passing approximately through the center of the field to be visualized or, in other words, the object field was confined to a location directly under and over (or before and behind) the field of motion of the tube and plate, respectively, while such superposition of the fields in the decentering method is not required. In the present invention, it may be freed from such centering; or secondly, with or without "decentering", a plane may be visualized other than parallel to the long axis by a tilting of the film surface (or an equivalent sensitive medium) with respect to the longitudinal axis. When such tilting is combined with planigraphic movement of tube and film, an object plane parallel to the film surface and containing the pivotal axis will be sharply visualized, regardless of whether the film surface is, or is not, parallel to the direction of film motion.

The term "visualization" or "visualizing" as used throughout this application, means the affecting of a chemically sensitized medium, such as a photographic film or plate of fluoroscopic screen to produce an eventual photoeffect, recognizable to the human eye.

The value of this method would be appreciated when it is taken into consideration that a radiograph taken by standard methods with a conical ray shows considerable relative distortion of parts because those parts near the film will appear approximately true size while those near the source of X-rays will be greatly enlarged. The proposed method of this invention does not cause a distorted image of the plane being visualized when the sensitized surface is tilted at an angle to the source of rays, because this plane is at all times parallel to the film surface. The blurred shadows of objects above or below the plane being studied, may be distorted, but such distortion does not detract from the interpretive value of the radiograph.

The objects of the present invention embrace all the objects of my prior patent and co-pending application, and further include the object of producing virtual focusing of X-rays in order to obtain selective radiographic visualization of planes parallel, or other than parallel, to the longitudinal axis of a body.

More specifically it is an object of the invention to provide a method of radiography by which transverse body planes may be visualized.

A further object is to provide means for accomplishing the foregoing objects.

Another object is to provide a method of, and means for, the decentering of a plane of an object to be visualized, the term "decentering" being applied as hereinbefore set forth.

Similarly an object of the invention is to provide a method of, and means for, avoiding the present day limitations of the planigraphic system, such as in my prior patent and application, and this object embraces decentering of tube and film or tilting of the film or both, as aforesaid, with the planigraphic principle as set forth in my prior patent and in my co-pending application.

In brief, the invention may be stated as employing a method and means wherein the sensitive medium is positioned in a plane parallel to the plane desired to be visualized or a method and means for decentering tube and film or both. In either case, synchronous proportional and opposite movements of the tube and sensitive medium provide for sectional visualization of planes parallel, or at any angle, to the longitudinal axis of the body.

In the drawings:

Figure 1 is a schematic drawing of a device embodying one form of the present invention.

Figure 2 is a diagram illustrating the actions of the device of Figure 1.

Figure 3 is a view similar to Figure 1 of another embodiment of the invention.

Figure 6 is an illustration of one practical machine embodying the means, and method, of the present invention and utilizing the method of the present invention.

Figure 5:
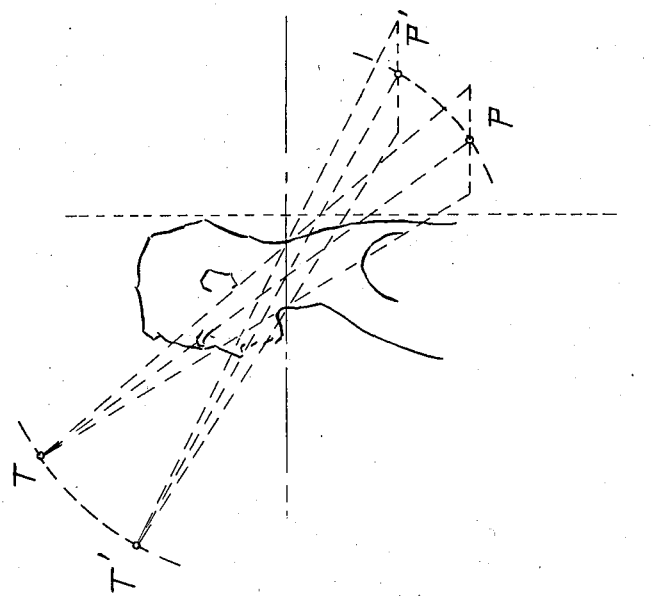
Figure 5 is a view similar to Figure 2 illustrating the action of the device of Figure 4.

Referring to Figure 1, it will be seen that the apparatus may employ a frame 10 which may be the horizontal table of an horizontal X-ray machine, or which may be the vertical standards and back of a vertical machine. Supported by the frame 10 is a pivot member 11 which, in a finished machine, will preferably be adjustable longitudinally of the frame by which adjustment the center of the transverse plane to be radiographed may be selected. Pivotally connected to the member 11 is a linkage arm 12 which, in the finished machine, will preferably be mounted in gimbals to provide for its free pivotal movement in all directions as distinct from a single plane pivot which might be inferred from the schematic drawing of Figure 1. The forward, or left hand, end of the arm 12 engages a tube 14, or, more preferably, a tube holder which is slidable in a guiding member 15. A tube supporting structure of the type disclosed in my prior patent may preferably be employed so as to permit various tube motions, but which guides the tube in such manner as to maintain it in the selected plane. It will be understood that the mounting of the tube is preferably such as to maintain the direction of the axis of the beam of ray emanation parallel with the arm 12.

The arm 12 extends beyond the pivot member 11 to the other side of the frame 10 and there engages a plate holder 16 or holder for a cassette containing a sensitive photographic film, which holder, for the purposes of illustration, is shown as positioned at right angles to the frame 10. A guiding structure 17 is provided for the holder 16 and is preferably arranged to permit the plate to move longitudinally of the frame; lost motion connectors 18 and 19 of the arm with the tube and plate holder, respectively, permitting reciprocation, oscillation, rotation or any other pivotal movement of the arm while transferring to the tube and plate similar, opposite and coordinated movements in planes parallel with each other.

With the tube and plate mounted, as shown, it will be apparent that, if, during exposure, the arm 12 is given a motion by hand, or otherwise, the blurring phenomenon, as explained in my prior patent and in my co-pending application, will bring about a sharp visualization of a plane through the body in which the pivoted point 11 is located and which is parallel to the plane of the plate holder 16. Such movement will have the effect of reducing the obstruction by shadows of objects laying in planes other than the plane through the body at the pivotal point 11.

It will be recalled that the virtual focusing of rays by the planigraphic movement of tube and plate is a result of the maintenance within practical limits of the ratio of tube to object distance with the plate to object distance. Now, referring to Figure 2, if the plane is the plane of which a radiograph is desired, the object, or the apparatus, will be set such that the pivot point of the arm 12 will lay in this plane. The plate holder will be adjusted to select the desired angularity of the plane and, as the tube moves from the point T to the point T', the plate will move from P to P'; the movements being synchronous and opposite. From a consideration of the diagram, it will be seen that distances T—T' and P—P' will, at all times, be in a given ratio, thus producing the virtual focusing as aforesaid. It will be further noted that the tube and plate are not over and under the object plane. Thus the invention combines the virtual focusing of the rays with the decentering of the object in such a manner as to secure the clear radiographic visualization of a plane at an angle to the longitudinal axis of the body.

Referring now to Figure 3, it will be seen that another form of the invention provides for the reversal of planes of movement for the tube and plate, whereas, in Figure 1, the tube moved in a plane parallel to the long axis of the body, and in Figure 3, the tube moves in a plane at right angles to the body; a system of links 23 being provided to direct the ray emanation of the tube at all times in the direction of the plate. In Figure 3, it will also be noted that the plate movement is in a single plane at right angles to the long axis of the body as distinct from movement parallel to the long axis and also that the tube and plate move in planes parallel to one another.

The structure for such an apparatus would be similar to that discussed in connection with Figure 1. A support, or frame, 20 carrying a pivot 21 and a linkage arm 22, one end of which engages a tube support 24 guided by a member 25, while the opposite end engages a plate holder 26 guided by a structure 27. In this case also the angle of the plane of the object would be determined by the plane of the plate surface; and movement imparted to the tube and plate by the arm 22 would not disturb the tube to object plane and object plane to plate ratio and again the object plane is decentered. In this illustration, it is also understood that a perfected machine would provide for various pivotal movements of the arm 22 and thus multi-directional movements of the tube and plate within the plane selected for these movements, as well as adjustment of the pivotal point of the arm 22 to select the object plane desired.

While the theory of operation of the devices of Figures 1 and 3 is identical and while their structure is similar, a difference in the radiograph of like planes will be different as may well be expected from the differences in plate and tube movement. It will, therefore, be understood that each may find its own specific usage where specific requirements will determine the choice of which form of the invention is preferable.

Figure 4:
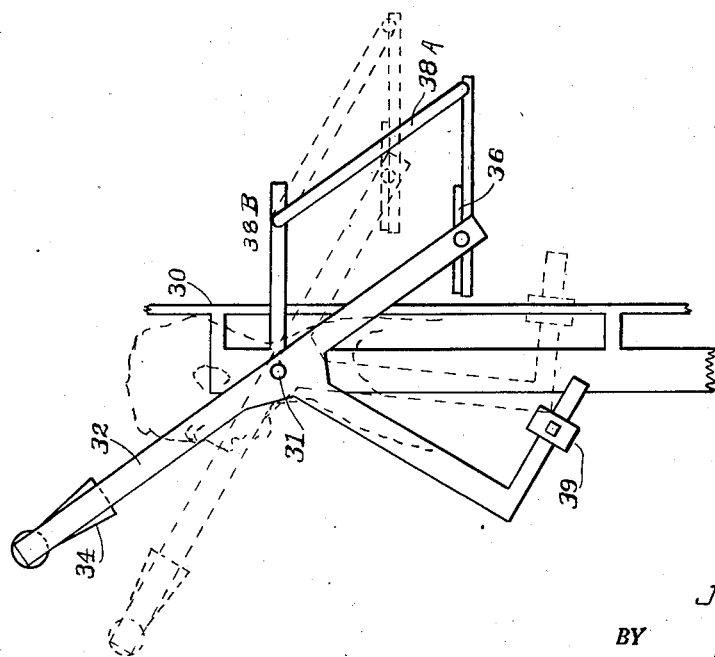
Figure 4 is a drawing similar to Figures 1 and 3 showing a still further form of the invention.

Referring now to Figure 4 of the drawings, it will be seen that this form of the invention is, in principle, a composition of the characteristics of movements of the machines of Figures 1 and 3. In this instance, a frame 30 suports a pivot 31, the location of which, with respect to the object, selects the center of the plane to be radiographed. An arm 32 moves about the pivot and carries on its anterior end a tube 34, while a plate 36 is supported by the opopsite end of the arm to move with it and is maintained in any predetermined angle by a parallelogram system, 38A and 38B, which angle determines the angle of the plane passing through the pivot which is to be visualized. A balance weight 39 may be applied, as shown, to form a counter-balance and permit a balanced free oscillation of the arm 32, thus to insure an even rhythmatic movement of the parts in any desired decentered relation.

By referring to Figure 5, it will be seen that this form of the invention combines a tube movement both towards and from the "long axis" of the object with a tube movement longitudinally of the axis, and, likewise, the plate moves not only longitudinally of the long axis but also towards and away from the same. Thus, by virtue of the movement of both tube and plate, this form of apparatus embodies a combination of the movements disclosed in Figures 1 and 3.

Further referring to Figure 5, it will be seen that, since T and T' are points in the arc of movement of the arm 32 and since P and P' are likewise points in the arc of movement of the opposite end of the arm 32, the movement of T—T' will always bear the same ratio to the movement P—P'; the plane radiographed being determined by the angular position of the plate with respect to the body and the relative position of the pivot 31 to the body. Here again is a form of the invention in which the type of radiograph will be characteristic of the particular machine and which, while partaking of the characteristics of both the machines of Figures 1 and 3, will be individual and find specific usefulness in specific fields.

Referring now to Figure 6, it will be seen that the invention is applicable to the structure of the machine of my co-pending application. By decentering the object, i. e., spreading the tube from the plate longitudinally of the long axis on opposite sides of the object field and setting the plate at an angle to the long axis, will achieve the method and means of the present invention.

For convenience of illustration, this is disclosed in conjunction with a horizontal geared type of machine by which similar gearing provides for like but opposite movements of tube and plate, the relative amplitude of such movements being determined by the theoretical pivotal point therebetween, which point determines the center of the plane radiographed, while the angularity of the plate holder determines the angle of the plane with respect to the long axis of the object.

In this form of the invention, the table is indicated by the dotted lines 40. Beneath the table, a plate holder 41 is mounted for angular adjustment to hold the plate at a predetermined angle with respect to the long axis of a body upon the table. The plate holder is rotatably moved by a link 42 through gears 43 and 44, while gears 45 transmit similar but opposite movement through gears 46 and 47 to a link 48 for moving a tube 49. An area 50 indicates the focal point of the rays and thus the plane, which is selected by the angularity of the plate holder, will be radiographed.

From the foregoing, it will be seen that decentering may be accomplished in various manners, and that it may be accomplished in conjunction with many types of relative tube and plate movements as to combine with it a virtual focusing, thus to achieve a clear, distinct and characteristic radiograph of transverse body sections.

The use of generic terms and diagrammatic drawings is intended to illustrate the general principles of the invention and indicates its applicability to numerous structures. Thus it will be seen that numerous changes and modifications of the apparatus and method of the present invention may be resorted to without departure from the spirit or scope of the appended claims.

Having set forth the nature of my invention, what I claim is:

1. A radiological method of selective plane visualization which is characterized by the steps of simultaneously and oppositely moving a source of radiations and a sensitive receiving medium while the surface of the sensitive receiving medium is in a plane divergent from the direction of its motion.

2. A radiological method of selective plane visualization which is characterized by the steps of moving a source of radiations and a sensitive receiving medium, during exposure, in paths, the approximate centers of which are disposed on opposite sides of a line perpendicular to the field to be visualized, said line being at the approximate center while the plane of the surface of the sensitive receiving medium is divergent from the direction of its movement.

3. A radiological method of selective plane visualization which is characterized by the steps of moving a source of radiations and a sensitive receiving medium, during exposure, in paths, the approximate centers of which are disposed in opposite sides of a line perpendicular to the field to be visualized, said line being at the approximate center and maintaining the direction of movement of the sensitive receiving medium and the source of radiations parallel to each other and while maintaining the plane of the surface of the sensitive receiving medium at all times divergent from the direction of its movement.

4. A radiological method of selective plane visualization which is characterized by the steps of simultaneously moving a source of radiations and a sensitive receiving medium, during exposure, in similar paths, the approximate centers of which are disposed on opposite sides of a line perpendicular to the field to be visualized, said line being at the approximate center and maintaining the direction of movement of the sensitive receiving medium parallel to a plane containing the long axis of the body, and while maintaining the plane of the surface of the sensitive receiving medium at all times divergent from the direction of its movement.

5. A radiological method of selective plane visualization which is characterized by the steps of simultaneously moving a source of radiations and a sensitive receiving medium, during exposure, in similar paths, the approximate centers of which are disposed on opposite sides of a line perpendicular to the field to be visualized, said line being at the approximate center and maintaining the direction of movement of the sensitive receiving medium in a plane perpendicular to the long axis of the body, and while maintaining the plane of the surface of the sensitive receiving medium at all times divergent from the direction of its movement.

6. A radiological method of selective plane visualization which is characterized by the steps of moving a source of radiations and a sensitive receiving medium, during exposure, in paths, the approximate centers of which are disposed on opposite sides of a line perpendicular to the field to be visualized, said line being at the approximate center, said movements having components both in a plane perpendicular to the long axis of the body and parallel to a plane containing the long axis of the body, and while maintaining the plane of the surface of the sensitive receiving medium at all times divergent from the direction of its movement.

7. In a radiological device, an apparatus which includes means for simultaneously and oppositely moving a source of radiations and a sensitive receiving medium while the surface of the sensitive receiving medium is in a plane at an angle to the direction of its motion.

8. In a radiological method of selective plane visualization in which an X-ray tube and an X-ray plate are simultaneously moved during exposure, the step of continuously moving said tube and plate during exposure and confining such motion to a tube travel path and a plate travel path, the centers of which are upon opposite sides of a plane perpendicular to the center of the field to be visualized.

9. In a radiological method of selective plane visualization in which an X-ray tube and an X-ray plate are simultaneously moved during exposure, the step of continuously moving said tube and plate during exposure with a motion such that at least more than half of the tube travel and plate travel are confined to opposite sides of a plane perpendicular to the center of the field to be visualized.

10. In a radiological method of selective plane visualization in which an X-ray tube and an X-ray plate are simultaneously moved during exposure, the step of continuously moving said tube and plate during exposure each in a cycle of motion, the centers of which are disposed on opposite sides of a plane perpendicular to the center of the field to be visualized.

11. In a radiological method of selective plane visualization in which an X-ray tube and an X-ray plate are simultaneously moved during exposure, the step of continuously moving said tube and plate during exposure in paths the extremities of which are equidistant from centers of motion which are located on opposite sides of a plane perpendicular to the center of the plane to be visualized.

12. In a radiological method of selective plane visualization in which an X-ray tube and an X-ray plate are simultaneously moved during exposure, the step of continuously moving said tube and plate during exposure in paths confined to opposite sides of a plane perpendicular to the center of the field to be visualized.

13. In a radiological method of selective plane visualization in which an X-ray tube and an X-ray plate are simultaneously moved during exposure, the step of continuously moving said tube and plate during exposure with a circular motion and plate during exposure with a circular motion the centers of curvature of which lie on opposite sides of a plane perpendicular to the center of the plane to be visualized.

14. In a radiological apparatus for plane visualization, a tube holder, means for supporting said holder for movement restricted to a given field, a plate holder, means for supporting said plate holder for movement in a restricted field, operating means for simultaneously moving said tube holder and said plate holder in their restricted fields, said operating means being arranged to locate the centers of such restricted fields on opposite sides of a plane perpendicular to the field to be visualized.

15. In a radiological apparatus for plane visualization, a tube holder, means for supporting said holder for planar movement restricted to a given field, a plate holder, means for supporting said plate holder for parallel planar movement in a restricted field, operating means for simultaneously moving said tube holder and said plate holder with parallel motion in their restricted fields, said operating means being arranged to locate the centers of such restricted fields on opposite sides of a plane perpendicular to the field to be visualized.

16. In a radiological apparatus for plane visualization, a tube holder, means for supporting said holder for planar movement restricted to a given field, a plate holder, means for supporting said plate holder for parallel planar movement in a restricted field and at an angle to the plane of its motion, operating means for simultaneously moving said tube holder and said plate holder with parallel motion in their restricted fields, said operating means being arranged to locate the centers of such restricted fields on opposite sides of a plane perpendicular to the field to be visualized.

17. In a radiological apparatus for plane visualization, a tube holder, means for supporting said holder for planar movement restricted to a given field, a plate holder, means for supporting said plate holder for parallel planar movement in a restricted field and at an angle to the plane of its motion, operating means for simultaneously moving said tube holder and said plate holder with circular motion in their restricted fields, said operating means being arranged to locate the centers of such restricted fields on opposite sides of a plane perpendicular to the field to be visualized.

18. In a radiological apparatus, a plate guide for supporting a plate for movement thereover in a given plane, means for mounting a plate for movement over said guide while disposed at an angle to the plane of its movement, and a tube support for movably supporting a tube for movement in a plane parallel to the plane of movement of said plate and means for synchronously moving said tube and plate in parallel planes while said plate is at an angle to the plane of its motion.

JEAN KIEFFER.